June 9, 1936. H. H. BIXLER 2,043,849
VALVE ASSEMBLY
Filed June 15, 1935
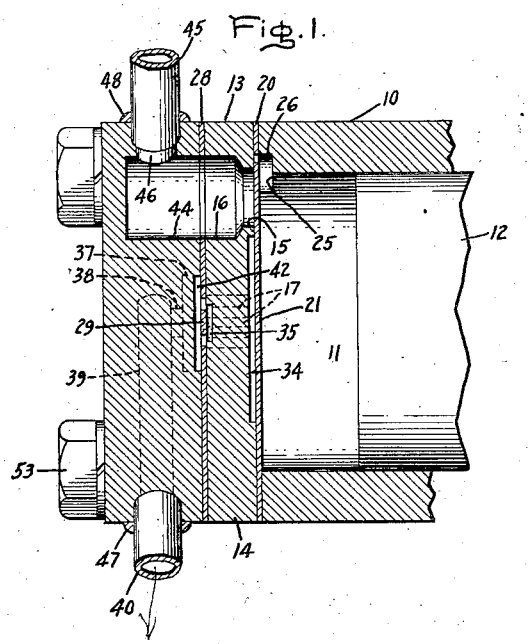
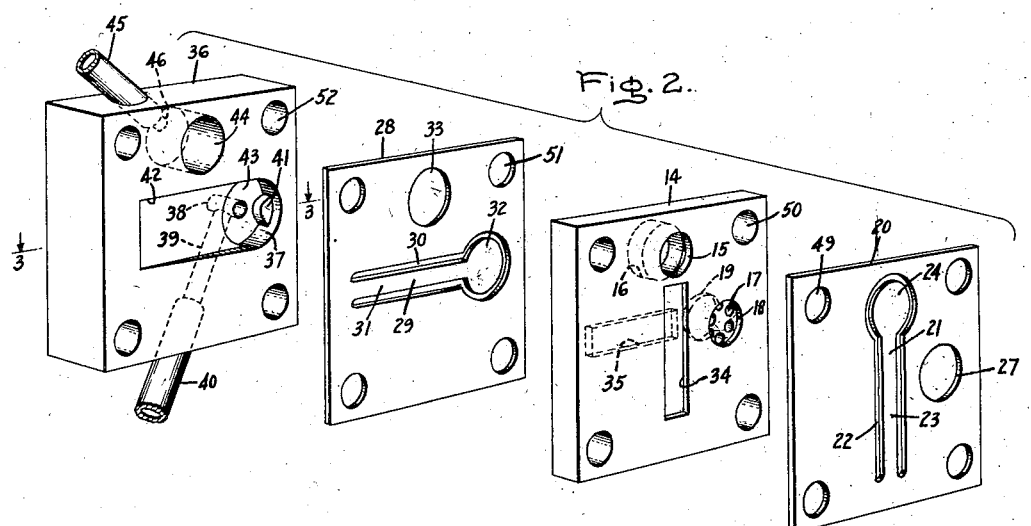
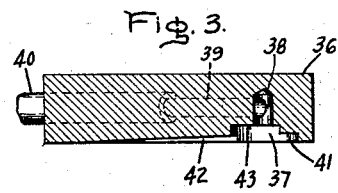
Inventor:
Harley H. Bixler,
by Harry E. Dunham
His Attorney.

Patented June 9, 1936

2,043,849

UNITED STATES PATENT OFFICE 2,043,849

VALVE ASSEMBLY

Harley H. Bixler, Schenectady, N. Y., assignor to General Electric Company, a corporation of New York Application June 15, 1935, Serial No. 26,796

19 Claims. (Cl. 230—231)

My invention relates to valve assemblies for refrigerant compressors or the like.

It is an object of my invention to provide a valve assembly for refrigerant compressors or the like which requires a minimum number of parts, is rugged in construction, and efficient in operation.

A further object of my invention is to provide a valve assembly for compressors or the like including an arrangement for minimizing the vibration of the discharge valve element of the valve assembly.

Further objects and advantages of my invention will become apparent as the following description proceeds and the features of novelty which characterize my invention will be pointed out with particularity in the claims annexed to and forming a part of this specification.

A better understanding of my invention may be had by reference to the accompanying drawing in which Fig. 1 is a side elevation, partly in section, of the end of a compressor cylinder provided with a valve assembly embodying my invention; Fig. 2 is an exploded perspective view of the valve assembly shown in Fig. 1; and Fig. 3 is a sectional view along the line 3—3 of the muffle box included in the valve assembly shown in Figs. 1 and 2.

Referring to the drawing, I have shown in Fig. 1, a refrigerant compressor cylinder 10 provided with a longitudinal cylinder bore 11 in which a cylindrical piston 12 is reciprocated by a Scotch yoke mechanism, or other suitable driving arrangement. The open end of the cylinder bore 11 is closed by a valve assembly 13 embodying my invention. The valve assembly 13 includes a rectangular valve plate 14 made of steel or the like and having flat interior and exterior parallel surfaces. The valve plate 14 is provided with an inlet passage 15 extending therethrough, the outer end of the inlet passage 15 being enlarged by a counterbore 16. The valve plate 14 is also provided with a series of discharge passages 17 extending therethrough and arranged in a circle. The discharge passages 17 communicate with annular recesses 18 and 19 formed in the opposite surfaces of the valve plate 14. The inlet passage 16 and discharge passages 17 are displaced approximately 90° with respect to each other about the center of the valve plate 14.

A rectangular sheet metal inlet valve supporting member 20 made of spring steel or the like is positioned on the inner surface of the valve plate 14 adjacent the cylinder 10. The inlet valve supporting member 20 is provided with an integral flexible tongue 21 formed therein by a U-shaped aperture 22 which may be punched or otherwise formed in the valve supporting member 20. The flexible tongue 21 includes an elongated body portion 23 and an enlarged circular end portion 24. The enlarged end portion 24 cooperates with a valve seat formed by the flat machined surface of the valve plate 14 surrounding the inlet passage 15 to close the latter. The inlet valve element thus formed by the flexible tongue 21 is flexed backwardly, about a transverse axis passing through the elongated body portion 23 thereof, away from the end of the inlet passage 15 when the fluid pressure in the inlet passage exceeds the fluid pressure in the cylinder bore 11 by a predetermined amount. Fluid is thus admitted to the cylinder bore 11. The opening movement of the flexible tongue 21 is limited by the shoulder 25 at the base of the slot 26 formed in the wall of the cylinder 10 surrounding the enlarged end 24 of the flexible tongue. The inlet valve supporting member 20 is also provided with a circular aperture 27 therein which surrounds the inner ends of the discharge passages 17, thus allowing free communication between the inner ends of the discharge passages and the interior of the cylinder bore 11.

A sheet metal discharge valve supporting member 28 made of a rectangular piece of spring steel or the like is positioned on the exterior surface of the valve plate 14. In the illustrative form of my invention, the discharge valve supporting element 28 is a duplicate of the inlet valve supporting member 20 in order that the cost of manufacture of the valve assembly may be minimized. A discharge valve element is provided in the discharge valve supporting member 28 by a flexible integral tongue 29 formed therein by a U-shaped aperture 30. The flexible tongue 29 includes an elongated body portion 31 and an enlarged circular end portion 32. The enlarged end portion 32 of the flexible tongue 29 cooperates with a valve seat formed by the flat machined surface of the valve plate 14 surrounding the outer ends of the discharge passages 17 to close the latter. When the fluid pressure within the discharge passages 17 exceeds the fluid pressure on the exterior of the flexible tongue 29 by a predetermined amount, the flexible tongue 29 is flexed backwardly, about a transverse axis passing through the elongated body portion 31 thereof, thus opening the discharge passages 17 and permitting the escape of compressed fluid from the interior of the cylinder bore 11. The discharge valve supporting member 28 is provided with a circular aperture 33 therein surrounding the outer end of the inlet passage 15 in order that the latter may be unobstructed.

The flexible tongues 21 and 29 provided in the inlet valve and discharge valve supporting members 20 and 28 respectively are arranged at right angles with respect to each other and the inlet passage 15 and discharge passages 17 formed in the valve plate 14 are also displaced approximately at a right angle with respect to each other about the center of the valve plate. By utilizing such an arrangement, the elongated body portions 23 and 31 of the flexible tongues 21 and 29 respectively may be given a maximum length without increasing the peripheral dimensions of the inlet valve and discharge valve supporting members 20 and 28. It is desirable that the elongated body portions 23 and 31 of the flexible tongues 21 and 29 respectively be given a maximum length within the permissible peripheral dimensions of the valve supporting members in order to minimize the angle of flexure thereof and hence the stress therein for a predetermined opening movement of the flexible tongues with respect to the openings which are closed by the valves.

Shallow rectangular recesses 34 and 35 are provided on the opposite surfaces of the valve plate 14 beneath the adjacent body portions 23 and 31 of the flexible tongues 21 and 29 respectively. The recesses 34 and 35 are made somewhat wider than the adjacent body portions of the flexible tongues and fluid is thus allowed to enter the recesses 34 and 35. The areas of contact between the flexible tongues 21 and 29 with the adjacent surfaces of the valve plate are thus minimized and correspondingly the possibility of the flexible tongues sticking on the valve plate is also minimized. Moreover, difficulty which might otherwise be encountered by a displacement of the flexible tongues, due to dirt or other foreign matter lodged between the same and the adjacent surfaces of the valve plate 14, is also obviated.

A rectangular muffle box 36 made from a block of steel or the like is positioned on the exterior surface of the discharge valve supporting element 28. The muffle box 36 is provided with a cylindrical discharge recess 37 in the interior surface thereof which surrounds the enlarged end portion 32 of the flexible tongue 29. A discharge passage 38 formed in the inner end of the recess 37 communicates through a passage 39 with a discharge conduit 40.

An arrangement is provided for directing the passage of high velocity fluid from the discharge passages 17 across the rear surface of the discharge valve element in order to reduce the pressure thereon. I have found that by so reducing the pressure on the exterior side of the discharge element that when it is moved to its open position under the influence of a predetermined fluid pressure in the discharge passages 17, it is retained firmly in the open position due to the reduced pressure on the exterior side thereof, thus avoiding chattering and vibration of the discharge valve element which might otherwise be encountered. This chattering or vibration of the discharge valve element ordinarily results from the fact that compressed fluid leaving the discharge passage spreads out over the valve seat and passes thereover at high velocity thus causing a low pressure area over the valve seat as compared to the pressure at the center of the discharge passage. The low pressure area over the valve seat tends to pull the discharge valve element down toward the seat while the pressure built up at the center of the passage tends to lift the discharge valve element from the seat. These two opposing pressure conditions result in an unstable condition of the discharge valve element and as a consequence it tends to vibrate. The frequency of this vibration of the discharge valve element is usually well above the lower limit of the audible range. In accordance with one aspect of my invention, I provide an arrangement for directing the high velocity fluid across the rear surface of the discharge valve element, thus reducing the pressure thereon. The area of the low pressure zone thus created on the rear surface of the discharge valve element is made greater than that over the valve seat on the opposite surface of the discharge valve element and, as a consequence, the differential in total pressure causes the discharge valve element to remain stable when in its open position. Aside from the problem of noise the valve arrangement I have provided also increases the efficiency of the compressor since it is unnecessary to build up so large a pressure to maintain the discharge valve element open when the pressure in the rear surface thereof is reduced. As a result the compressor works against a smaller back pressure and more efficient operation is had. Chattering or vibration of the discharge valve element is particularly objectionable as compared to the vibration of the inlet valve element, for example, since the fluid in the discharge conduit is much more dense than that in the inlet conduit and, as a consequence, a much better conductor of sound waves. As a result, vibratory movement of the discharge element and chattering of the same against the adjacent retainer or stop therefor when in its open position results in a noisy operation of the compressor.

In the illustrative form of my invention, an integral stop 41 is formed at one side of the recess 37 which limits the opening movement of the enlarged end portion 32 of the flexible tongue 29. The face of the stop 41 against which the enlarged end of the flexible tongue rests is made with a comparatively small area in order that a maximum portion of the rear surface of the enlarged end portion 32 of the flexible tongue 29 will be exposed to fluid passing thereover. The face of the stop 41 is made in alignment with the bottom of a wedge-shaped slot 42 formed in the inner surface of the muffle box 36, as best shown in Fig. 3. The elongated body portion 31 of the flexible tongue 29 rests on the bottom of the wedge-shaped slot 42 when the flexible tongue is in its open position and since the bottom of the slot 42 and the face of the stop 41 are in alignment, the flexible tongue is maintained in a substantially rectilinear configuration when in its open position. The inner or bottom wall 43 of the discharge recess 37 is arranged closely adjacent the rear surface of the enlarged end 32 of the flexible tongue 29 when the latter is in its open position, so that fluid passing from the discharge passages 37 passes around the edges of the enlarged end 32 of the flexible tongue and then through the narrow space between the bottom wall 43 of the recess 37 and the adjacent face of the enlarged end 32 of the flexible tongue into the passage 38. The high velocity fluid leaving the discharge passages is thus directed over the rear surface of the enlarged end 32 of the flexible tongue 29 and causes a low pressure area to be formed thereon. As a consequence, the pressure on the front side of the enlarged end 32 of the flexible tongue adjacent the outer ends of the discharge passages 17 exceeds the pressure on the rear surface thereof so that the flexible tongue 29 is pushed back firmly against the bottom of the slot 42 and stop 41 when in its open position.

The depth of the stop 41 has been somewhat exaggerated in the drawing in order to better illustrate the form thereof. In a compressor for sulphur-dioxide or similar vaporizable refrigerant having a displacement of approximately 1 cu. in. per stroke, the enlarged end 32 of the flexible tongue 29 may conveniently have a diameter of about ⅜". In such case, the passage 38 may be given a diameter of .157" and the stop 41 may be given a depth of 1/32". When the parts are so dimensioned the maximum differential in pressure tending to flex the discharge valve element to its open position is of the order of about 15 to 20 pounds per square inch.

The muffle box 36 is provided with a cylindrical inlet recess 44 formed in the inner face thereof surrounding the counterbored end 16 of the inlet passage 15. The inlet recess 44 in the muffle box 36 communicates with the inlet conduit 45 through a passage 46 formed in the muffle box. The discharge and inlet conduits 40 and 45 respectively are firmly fitted in complementary bores formed in the muffle box 36 and are secured thereto by welding as indicated at 47 and 48.

The inlet valve supporting member 20, valve plate 14, discharge valve supporting member 28 and muffle box 36 are provided with holes 49, 50, 51 and 52, respectively, adjacent the corners thereof. Screws 53 passing through the holes 49, 50, 51 and 52 are threaded in suitable tapped holes formed in the compressor cylinder 10 and thus hold the valve assembly 13 in its assembled position on the end of the cylinder 10.

In the operation of the machine described above, gaseous refrigerant such as sulphur dioxide is supplied to the inlet passage 15 through the inlet conduit 45, passage 46 and recess 44. When the piston 12 is retracted in the cylinder bore 11 in its suction stroke the fluid pressure within the cylinder bore 11 is decreased and when the pressure in the inlet passage 15 exceeds the pressure in the cylinder bore 11 by a predetermined amount, the flexible inlet valve tongue 21 is flexed backwardly against the shoulder 25 formed on the cylinder 10 thus opening the inlet passage 15. Gaseous refrigerant thus flows into the interior of the cylinder bore 11 from the inlet passage 15. During the suction stroke of the piston 12, the flexible discharge tongue 29 is firmly seated against the seat formed on the exterior surface of the valve plate 14 surrounding the discharge passages 17 by the pressure of the compressed gaseous refrigerant in the discharge recess 37 thus closing the discharge passages 17. When the direction of movement of the reciprocating piston 12 is reversed, and it moves toward the head of the cylinder on the compression stroke, the gaseous refrigerant in the cylinder bore 11 is compressed and the pressure thereof on the inner surface of the flexible inlet valve tongue 21 causes the same to flex back to its flat position thus cooperating with the seat formed on the inner surface of the valve 14 surrounding the inlet passage 15 to close the latter. When the pressure of the compressed gaseous refrigerant within the cylinder bore 11 exceeds the pressure of the gaseous refrigerant in the discharge recess 37 by a predetermined amount, the flexible discharge valve tongue 29 is flexed backwardly against the bottom of the slot 42 and stop 41, thus opening the discharge passages 17 and allowing gaseous refrigerant to escape therethrough from the cylinder bore 11 into the discharge recess 37. The discharged gaseous refrigerant flowing about the edges of the enlarged end 32 of the flexible tongue 29 flows through the restricted space between the bottom wall 33 of the recess 37 and the rear surface of the enlargement 32, thus forming a low pressure zone adjacent the rear surface of the enlargement 32. As a consequence, the excess of pressure of the gaseous refrigerant on the surface of the enlargement 32 adjacent the ends of the discharge passage 17 causes the flexible tongue 29 to be firmly pressed against the bottom of the slot 42 and the face of the stop 41. The compressed gaseous refrigerant flows from the discharge recess 37 to the passages 38 and 39, to the discharge conduit 40 through which it is supplied to a suitable refrigerant condenser or the like.

While I have shown a particular embodiment of my invention in connection with a reciprocating type refrigerant compressor, I do not desire my invention to be limited to the particular construction shown and described and I intend, in the appended claims, to cover all modifications within the spirit and scope of my invention.

What I claim as new and desire to secure by Letters Patent of the United States, is:

1. A valve assembly for compressors comprising a valve plate or the like having a passage therein through which fluid to be discharged passes, a seat surrounding said passage, a discharge valve element cooperating with said seat to close said passage, and means directing high velocity compressed fluid from said passage across the rear surface of said discharge valve element opposite said passage for reducing the pressure on said rear surface of said discharge valve element to minimize vibration thereof.

2. A valve assembly for compressors comprising a valve plate or the like having a passage therein through which fluid to be discharged passes, a seat surrounding said passage, a thin resilient elongated discharge valve element adapted to flex about a transverse axis and supported at one side of said passage cooperating with said seat to close said passage, and means directing high velocity compressed fluid from said passage across the rear surface of said discharge valve element opposite said passage for reducing the pressure on said rear surface of said discharge valve element to minimize vibration thereof.

3. A valve assembly for compressors comprising a valve plate or the like having a flat exterior surface and having a discharge passage extending therethrough, a seat surrounding said passage, a sheet metal discharge valve supporting member extending across said exterior surface of said valve plate, said discharge valve supporting member having an elongated flexible integral tongue therein forming a discharge valve element cooperating with said seat to close said passage, and means directing high velocity compressed fluid from said passage across the rear surface of said discharge valve element opposite said passage for reducing the pressure on said rear surface of said discharge valve element to minimize vibration thereof.

4. A valve assembly for compressors comprising a valve plate or the like having a passage therein through which fluid to be discharged passes, a seat surrounding said passage, a discharge valve element cooperating with said seat to close said passage, a muffle box positioned on the exterior side of said valve plate and having a discharge recess therein surrounding said discharge valve element, and means including a wall of said recess positioned closely adjacent the rear surface of said valve element directing high velocity compressed fluid from said passage across the rear surface of said discharge valve element opposite said passage for reducing the pressure on said rear surface of said discharge valve element to minimize vibration thereof.

5. A valve assembly for compressors comprising a valve plate or the like having a passage therein through which fluid to be discharged passes, a seat surrounding said passage, a thin resilient elongated discharge valve element adapted to flex about a transverse axis and supported at one side of said passage cooperating with said seat to close said passage, a muffle box positioned on the exterior side of said valve plate and having a discharge recess therein surrounding the portion of said discharge valve element, and means including a wall of said recess positioned adjacent the rear surface of said valve element directing high velocity compressed fluid from said passage across the rear surface of said discharge valve element opposite said passage for reducing the pressure on said rear surface of said discharge valve element to minimize vibration thereof.

6. A valve assembly for compressors comprising a valve plate or the like having a flat exterior surface and having a discharge passage extending therethrough, a seat surrounding said passage, a sheet metal discharge valve supporting member extending across said exterior surface of said valve plate, said discharge valve supporting member having an elongated flexible integral tongue therein forming a discharge valve element cooperating with said seat to close said passage, a muffle box positioned on said flat exterior surface of said valve plate and having a discharge recess therein surrounding the portion of said flexible tongue extending across said passage, and means including a wall of said recess positioned closely adjacent the rear surface of said flexible tongue directing high velocity compressed fluid from said passage across the rear surface of said flexible tongue opposite said passage for reducing the pressure on said rear surface of said flexible tongue to minimize vibration thereof.

7. A valve assembly for compressors comprising a valve plate or the like having a passage therein through which fluid to be discharged passes, a seat surrounding said passage, a discharge valve element cooperating with said seat to close said passage, a muffle box positioned on the exterior side of said valve plate and having a discharge recess therein surrounding said discharge valve element, a stop formed in said recess and adapted to limit the opening movement of said valve element, and means including a wall of said recess positioned closely adjacent the rear surface of said valve element directing high velocity compressed fluid from said passage across the rear surface of said discharge valve element opposite said passage for reducing the pressure on said rear surface of said discharge valve element to minimize vibration thereof.

8. A valve assembly for compressors comprising a valve plate or the like having a flat exterior surface and a discharge passage extending therethrough, a seat surrounding said passage, a sheet metal discharge valve supporting member extending across said flat exterior surface of said valve plate, said discharge valve supporting member having an elongated flexible integral tongue therein forming a discharge valve element cooperating with said seat to close said passage, a muffle box positioned on the exterior side of said valve plate and having a discharge recess therein surrounding the portion of said discharge valve element adjacent said passage, said muffle box also having a wedge-shaped slot therein communicating with said recess, a stop formed in said recess having a face of relatively small area in alignment with the bottom of said slot, said bottom of said slot and said stop being adapted to limit the opening movement of said valve element, and means including a wall of said recess positioned closely adjacent the rear surface of said portion of said flexible tongue adjacent said passage directing high velocity compressed fluid from said passage across the rear surface of said flexible tongue opposite said passage for reducing the pressure on said rear surface of said flexible tongue to minimize vibration thereof.

9. A valve assembly for compressors comprising a valve plate or the like having a flat exterior surface and a discharge passage extending therethrough, a sheet metal discharge valve supporting member extending across said flat exterior surface of said valve plate, said discharge valve supporting member having an elongated flexible integral tongue formed therein, said flexible tongue being provided with an enlarged end cooperating with said valve plate to close said passage, a muffle box positioned on said flat exterior side of said valve plate and having a discharge recess therein surrounding said enlarged end portion of said flexible tongue, said muffle box also being provided with a wedge-shaped slot communicating with said recess, a stop formed in said recess having a face of relatively small area in alignment with the bottom of said slot, said bottom of said slot and said stop being adapted to limit the opening movement of said flexible tongue, and means including a wall of said recess positioned closely adjacent the rear surface of said enlarged end portion of said flexible tongue directing high velocity compressed fluid from said passage past the rear surface of said enlarged end portion for reducing the pressure on said rear surface of said enlarged end portion to minimize vibration of said flexible tongue.

10. A valve assembly for compressors comprising a valve plate or the like having a flat exterior surface and a series of discharge passages extending therethrough, a sheet metal discharge valve supporting member extending across said flat exterior surface of said valve plate, said discharge valve supporting member having an elongated flexible integral tongue formed therein, said flexible tongue being provided with an enlarged end cooperating with said valve plate to close said series of discharge passages, a muffle box positioned on said flat exterior side of said valve plate and having a discharge recess therein surrounding said enlarged end portion of said flexible tongue, said muffle box also being provided with a wedge-shaped slot communicating with said recess, a stop formed in said recess having a face of relatively small area in alignment with the bottom of said slot, said bottom of said slot and said stop being adapted to limit the opening movement of said flexible tongue, and means including a wall of said recess positioned closely adjacent the rear surface of said enlarged end portion of said flexible tongue directing high velocity compressed fluid from said series of discharge passages past the rear surface of said enlarged end portion for reducing the pressure on said rear surface of said enlarged end portion to minimize vibration of said flexible tongue.

11. A valve assembly for compressors comprising a valve plate or the like having a flat surface on one side thereof, a passage extending through said valve plate, and a sheet metal valve supporting member positioned on said flat surface of said valve plate and having an integral flexible tongue formed therein cooperating with said valve plate to close said passage when said tongue is substantially in alinement with said flat surface of said valve plate, said tongue being movable upwardly away from said valve plate to open said passage, said valve plate being provided with a shallow recess in said flat surface thereof beneath only a portion of said flexible tongue minimizing the area of contact between said flexible tongue and said valve plate, said flexible tongue being positioned outside said recess in both its open and closed positions.

12. A valve assembly for compressors comprising a valve plate or the like having flat surfaces on two opposite sides thereof, said valve plate having a discharge passage and an inlet passage extending therethrough, a sheet metal discharge valve supporting member positioned on one of said flat surfaces of said valve plate and having a flexible integral tongue formed therein cooperating with said valve plate to close said discharge passage when said tongue is substantially in alinement with said flat surface of said valve plate, said tongue being movable upwardly away from said valve plate to open said discharge passage, and a sheet metal inlet valve supporting member positioned on the other of said flat surfaces of said valve plate and having a flexible integral tongue formed therein cooperating with said valve plate to close said inlet passage when said tongue is substantially in alinement with said flat surface of said valve plate, said tongue being movable upwardly away from said valve plate to open said inlet passage, said valve plate being provided with a shallow recess in each of said flat surfaces thereof beneath said flexible tongues minimizing the area of contact between said flexible tongues and said valve plate, said flexible tongues being positioned outside said recesses in both their open and closed positions.

13. A discharge valve assembly for compressors comprising a valve plate or the like having flat surfaces on two opposite sides thereof, said valve plate having a discharge passage and an inlet passage extending therethrough, a sheet metal discharge valve supporting member positioned on one of said flat surfaces of said valve plate and having a flexible integral tongue formed therein, said flexible tongue having an elongated body portion and an enlarged end portion cooperating with said valve plate to close said discharge passage, and a sheet metal inlet valve supporting member positioned on the other of said flat surfaces of said valve plate and having a second flexible integral tongue formed therein, said second flexible tongue having an elongated body portion and an enlarged end portion cooperating with said valve plate to close said inlet passage, said valve plate being provided with a recess in each of said flat surfaces thereof beneath said elongated body portions of said flexible tongues minimizing the area of contact between said elongated body portions of said flexible tongues and said valve plate.

14. A valve assembly for compressors comprising a valve plate or the like having flat surfaces on two opposite sides thereof, said valve plate having a discharge passage and an inlet passage extending therethrough, said discharge passage and said inlet passage being displaced approximately at right angles with respect to each other about the center of said valve plate, a sheet metal discharge valve supporting member positioned on one of said flat surfaces of said valve plate and having a flexible integral tongue therein cooperating with said valve plate to close said discharge passage and having an aperture therein surrounding one end of said inlet passage, and a sheet metal inlet valve supporting member positioned on the other of said flat surfaces of said valve plate and having a second flexible integral tongue formed therein cooperating with said valve plate to close said inlet passage and having an aperture therein surrounding one end of said discharge passage, said flexible tongues being arranged at approximately right angles with respect to each other, said valve plate being provided with a recess in each of said flat surfaces thereof beneath said flexible tongues minimizing the area of contact between said flexible tongues and said valve plate.

15. A valve assembly for compressors comprising a valve plate or the like having flat surfaces on two opposite sides thereof, said valve plate having a discharge passage and an inlet passage extending therethrough, said discharge passage and said inlet passage being displaced approximately at right angles with respect to each other about the center of said valve plate, a sheet metal discharge valve supporting member positioned on one of said flat surfaces of said valve plate and having a flexible integral tongue therein cooperating with said valve plate to close said discharge passage and having an aperture therein surrounding one end of said inlet passage, and a sheet metal inlet valve supporting member positioned on the other of said flat surfaces of said valve plate and having a second flexible integral tongue formed therein cooperating with said valve plate to close said inlet passage and having an aperture therein surrounding one end of said discharge passage, said flexible tongues being arranged at approximately right angles with respect to each other.

16. A valve assembly for compressors comprising a valve plate or the like having flat surfaces on two opposite sides thereof, said valve plate having a discharge passage and an inlet passage extending therethrough, said discharge passage and said inlet passage being displaced at approximately right angles with respect to each other about the center of said valve plate, a sheet metal discharge valve supporting member positioned on one of said flat surfaces of said valve plate and having a flexible integral tongue formed therein, said tongue having an elongated body portion and an enlarged end portion cooperating with said valve plate to close said discharge passage, said discharge valve supporting member being provided with an aperture surrounding one end of said inlet passage, and a sheet metal inlet valve supporting member positioned on the other of said flat surfaces of said valve plate and having a second flexible integral tongue formed therein, said second flexible tongue having an elongated body portion and an enlarged end portion cooperating with said valve plate to close said inlet passage, said flexible tongues being arranged at substantially right angles with respect to each other and said inlet valve supporting member being provided with an aperture therein surrounding one end of said discharge passage.

17. A valve assembly for compressors comprising a valve plate or the like having a fluid passage therein, a valve seat on said valve plate and surrounding one end of said passage, a sheet metal valve supporting member positioned on a surface of said valve plate, said valve supporting member having an elongated flexible integral tongue formed therein cooperating with said seat to close said passage and flexing to a position displaced from said seat to open said passage, and means for supporting said tongue throughout substantially the entire length thereof when said tongue is flexed to its open position.

18. A valve assembly for compressors comprising a valve plate or the like having a fluid passage formed therein, a valve seat on said valve plate and surrounding one end of said passage, a sheet metal valve supporting member positioned on a surface of said valve plate, said valve supporting member having a flexible integral tongue formed therein, said flexible tongue being provided with an elongated body portion and an enlarged end cooperating with said seat to close said passage and flexing to a position displaced from said seat to open said passage, means for supporting said elongated body portion of said flexible tongue throughout substantially the entire length thereof when said flexible tongue is flexed to its open position, and means including a stop having a face of relatively small area for limiting the opening movement of said enlarged end of said flexible tongue.

19. A valve assembly for compressors comprising a valve plate or the like having a fluid passage formed therein, a valve seat on said valve plate and surrounding one end of said passage, a sheet metal valve supporting member positioned on a surface of said valve plate, said valve supporting member having an elongated flexible integral tongue formed therein cooperating with said seat to close said passage and flexing to a position displaced from said seat to open said passage, a member having a recess formed therein surrounding said flexible tongue, and means including a supporting wall formed on said last mentioned member for supporting said flexible tongue throughout substantially the entire length thereof when said tongue is flexed to its open position.

HARLEY H. BIXLER.